(12) United States Patent
Song et al.

(10) Patent No.: US 12,190,279 B2
(45) Date of Patent: Jan. 7, 2025

(54) METHOD AND APPARATUS FOR REPLACING PARTS OF DEVICE IN MACHINE TO MACHINE SYSTEM

(71) Applicants: Hyundai Motor Company, Seoul (KR); Kia Corporation, Seoul (KR); Industry Academy Cooperation Foundation of Sejong University, Seoul (KR)

(72) Inventors: Jae Seung Song, Seoul (KR); Min Byeong Lee, Gyeonggi-do (KR)

(73) Assignees: Hyundai Motor Company, Seoul (KR); Kia Corporation, Seoul (KR); Industry Academy Cooperation Foundation of Sejong University, Seoul (KR)

( * ) Notice: Subject to any disclaimer, the term of this patent is extended or adjusted under 35 U.S.C. 154(b) by 346 days.

(21) Appl. No.: 17/533,844

(22) Filed: Nov. 23, 2021

(65) Prior Publication Data

US 2022/0164769 A1 May 26, 2022

Related U.S. Application Data

(60) Provisional application No. 63/117,535, filed on Nov. 24, 2020.

(51) Int. Cl.
*G06Q 10/0833* (2023.01)
*G06Q 10/20* (2023.01)
*H04W 4/70* (2018.01)

(52) U.S. Cl.
CPC ......... *G06Q 10/0833* (2013.01); *G06Q 10/20* (2013.01); *H04W 4/70* (2018.02)

(58) Field of Classification Search
None
See application file for complete search history.

(56) References Cited

U.S. PATENT DOCUMENTS 6,044,154 A * 3/2000 Kelly .................. H04L 63/0428
380/282
9,083,537 B2 * 7/2015 Finch .................... H04W 12/06
(Continued)

FOREIGN PATENT DOCUMENTS

| WO | WO2012109742 A2 * | 8/2012 | ............... G07C 5/08 |
| WO | WO2015120480 A1 * | 8/2015 | ............. H04L 29/08 |
| WO | WO2015131860 A1 * | 9/2015 | ............. G06Q 20/32 |

OTHER PUBLICATIONS

O. Bello and S. Zeadally, "Intelligent Device-to-Device Communication in the Internet of Things," in IEEE Systems Journal, vol. 10, No. 3, pp. 1172-1182, Sep. 2016, doi: 10.1109/JSYST.2014. 2298837 (Year: 2016).*

(Continued)

*Primary Examiner* — Paul R Fisher
(74) *Attorney, Agent, or Firm* — Fox Rothschild LLP

(57) ABSTRACT

A method and apparatus of managing information are configured to replace parts of an Internet of Things (IoT) device in a machine-to-machine (M2M) system. A method for operating a first device may include receiving a first message for requesting registration of at least one resource related to a second device including a plurality of parts, generating at least one resource comprising information on the plurality of parts, and transmitting, to the second device, a second message for recommending replacement of a part corresponding to a condition for replacing at least one of the plurality of parts when the condition is satisfied.

15 Claims, 8 Drawing Sheets

(56) References Cited

U.S. PATENT DOCUMENTS

| | | | |
|---|---|---|---|
| 2002/0193923 A1 | 12/2002 | Toyama et al. | |
| 2003/0014372 A1* | 1/2003 | Wheeler | H04L 9/3231 |
| | | | 705/71 |
| 2005/0096934 A1* | 5/2005 | Wakui | G06Q 30/02 |
| | | | 705/1.1 |
| 2007/0038532 A1* | 2/2007 | Vyas | G06Q 10/087 |
| | | | 705/28 |
| 2015/0033312 A1* | 1/2015 | Seed | H04L 67/141 |
| | | | 709/227 |
| 2016/0358143 A1* | 12/2016 | Foti | G06Q 20/389 |
| 2019/0005464 A1* | 1/2019 | Harris, III | G06Q 10/20 |
| 2019/0066159 A1* | 2/2019 | Caudillo | B60R 16/0234 |
| 2020/0041944 A1* | 2/2020 | Hiraike | G03G 15/556 |
| 2021/0342790 A1* | 11/2021 | Dagley | G06F 16/787 |

OTHER PUBLICATIONS

OneM2M Technical Report, "Use Case TR", Document No. oneM2M-REQ-2012-0065R06-Use_Case-TR, dated Dec. 7, 2012, XP84000509A, 45 pages.

* cited by examiner

METHOD AND APPARATUS FOR REPLACING PARTS OF DEVICE IN MACHINE TO MACHINE SYSTEM

CROSS REFERENCE TO RELATED APPLICATION

The present application claims the benefit of U.S. Provisional Application No. 63/117,535, filed Nov. 24, 2020, the entire contents of which are incorporated herein by reference.

BACKGROUND

(a) Technical Field

The present disclosure relates to a method and apparatus for managing information on parts of a device in a machine-to-machine (M2M) system, more particularly, to the method and apparatus for managing information related to replacing parts of an Internet of Things (IoT) device in an M2M system.

(b) Description of the Related Art

Recently, the use of Machine-to-Machine (M2M) systems has become more widespread. An M2M communication may refer to a communication performed between machines without human intervention. M2M may encompass Machine Type Communication (MTC), Internet of Things (IoT) or Device-to-Device (D2D). In the following description, the term "M2M" is uniformly used for convenience of explanation, but the present disclosure is not limited thereto. A terminal used for M2M communication may be an M2M terminal or an M2M device. An M2M terminal may generally be a device having low mobility while transmitting a small amount of data. Herein, the M2M terminal may be used in connection with an M2M server that centrally stores and manages inter-machine communication information. In addition, an M2M terminal may be applied to various systems such as object tracking, automobile linkage, and power metering.

Meanwhile, with respect to an M2M terminal, the oneM2M standardization organization provides requirements for M2M communication, things to things communication and IoT technology, and technologies for architecture, Application Program Interface (API) specifications, security solutions and interoperability. The specifications of the oneM2M standardization organization provide a framework to support a variety of applications and services such as smart cities, smart grids, connected cars, home automation, security and health.

SUMMARY

The present disclosure is directed to provide a method and apparatus for managing information on parts of a device in a machine-to-machine (M2M) system.

The present disclosure is directed to provide a method and apparatus for maximizing the performance of an IoT device by managing parts of the device in an M2M system.

The present disclosure is directed to provide a method and apparatus for providing information on replacement time of parts of a device in an M2M system.

According to an embodiment of the present disclosure, a method for operating a first device in a machine-to-machine (M2M) system may include receiving a first message for requesting registration of at least one resource related to a second device including a plurality of parts, generating at least one resource including information on the plurality of parts, and, transmitting, to the second device, a second message for recommending replacement of a part corresponding to a condition for replacing at least one of the plurality of parts if the condition is satisfied.

According to an embodiment of the present disclosure, a method for operating a second device in a machine-to-machine (M2M) system may include receiving, from a first device managing information on parts in the second device, a message for recommending replacement of a part among parts and, in response to the receiving of the message, outputting an alarm notifying occurrence of a recommendation concerning the part.

According to an embodiment of the present disclosure, a first device in a machine-to-machine (M2M) system may include a transceiver and a processor coupled with the transceiver. The processor may be configured to receive a first message, which requests registration of at least one resource related to a second device including a plurality of parts, generate at least one resource including information on the plurality of parts and, transmit, to the second device, a second message for recommending replacement of a part corresponds to a condition for replacing at least one of the plurality of parts if the condition is satisfied.

According to an embodiment of the present disclosure, a second device in a machine-to-machine (M2M) system may include a transceiver and a processor coupled with the transceiver. The processor may be configured to receive, from a first device managing information on parts in the second device, a message for recommending replacement of a part among parts and, in response to the receiving of the message, to output an alarm notifying occurrence of a recommendation concerning the part.

According to the present disclosure, information on replaceable parts of a device in a machine-to-machine (M2M) system may be efficiently managed.

BRIEF DESCRIPTION OF THE DRAWINGS

The above and other objects, features and advantages of the present disclosure will be more clearly understood from the following detailed description taken in conjunction with the accompanying drawings, in which.

DETAILED DESCRIPTION

Figure 1:
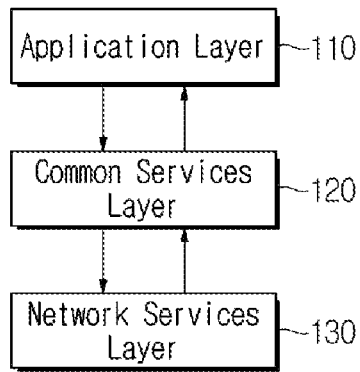
FIG. 1 illustrates a layered structure of a machine-to-machine (M2M) system according to the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a controller area network (CAN).

Hereinafter, embodiments of the present disclosure will be described in detail with reference to the accompanying drawings, which will be easily implemented by those skilled in the art. However, the present disclosure may be embodied in many different forms and is not limited to the exemplary embodiments described herein.

In the present disclosure, the terms first, second, etc. are used only for the purpose of distinguishing one component from another, and do not limit the order or importance of components, etc. unless specifically stated otherwise. Thus, within the scope of this disclosure, a first component in one embodiment may be referred to as a second component in another embodiment, and similarly a second component in one embodiment may be referred to as a first component.

In the present disclosure, when a component is referred to as being "linked", "coupled", or "connected" to another component, it is understood that not only a direct connection relationship but also an indirect connection relationship through an intermediate component may also be included.

In the present disclosure, components that are distinguished from each other are intended to clearly illustrate each feature. However, it does not necessarily mean that the components are separate. In other words, a plurality of components may be integrated into one hardware or software unit, or a single component may be distributed into a plurality of hardware or software units. Thus, unless otherwise noted, such integrated or distributed embodiments are also included within the scope of the present disclosure.

In the present disclosure, components described in the various embodiments are not necessarily essential components, and some may be optional components. Accordingly, embodiments consisting of a subset of the components described in one embodiment are also included within the scope of the present disclosure. Also, exemplary embodiments that include other components in addition to the components described in the various exemplary embodiments are also included in the scope of the present disclosure.

In the following description of the embodiments of the present disclosure, a detailed description of known functions and configurations incorporated herein will be omitted when it may make the subject matter of the present disclosure rather unclear. Parts not related to the description of the present disclosure in the drawings are omitted, and like parts are denoted by similar reference numerals.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

In addition, the present specification describes a network based on Machine-to-Machine (M2M) communication, and work performed in an M2M communication network may be performed in a process of network control and data transmission in a system managing the communication network. In the present specification, an M2M terminal may be a terminal performing M2M communication. However, in consideration of backward compatibility, it may be a terminal operating in a wireless communication system. In other words, an M2M terminal may refer to a terminal operating based on M2M communication network but is not limited thereto. An M2M terminal may operate based on another wireless communication network and is not limited to the exemplary embodiment described above.

In addition, an M2M terminal may be fixed or have mobility. An M2M server refers to a server for M2M communication and may be a fixed station or a mobile station. In the present specification, an entity may refer to hardware like M2M device, M2M gateway and M2M server.

In addition, for example, an entity may be used to refer to software configuration in a layered structure of M2M system and is not limited to the embodiment described above.

In addition, for example, the present disclosure mainly describes an M2M system but is not solely applied thereto. In addition, an M2M server may be a server that performs communication with an M2M terminal or another M2M server. In addition, an M2M gateway may be a connection point between an M2M terminal and an M2M server. For example, when an M2M terminal and an M2M server have different networks, the M2M terminal and the M2M server may be connected to each other through an M2M gateway. Herein, for example, both an M2M gateway and an M2M server may be M2M terminals and are not limited to the embodiment described above. The present disclosure relates to a method and apparatus for managing information on parts of a device in a machine-to-machine (M2M) system. Particularly, the present disclosure relates to a technique for managing information related to replacing parts of an IoT (Internet of Things) device in an M2M system.

Further, oneM2M is a de facto standards organization that was founded to develop a communal IoT service platform sharing and integrating application service infrastructure (platform) environments beyond fragmented service platform development structures limited to separate industries like energy, transportation, national defense and public service.oneM2M aims to render requirements for things to things communication and IoT technology, architectures, Application Program Interface (API) specifications, security solutions and interoperability. For example, the specifications of oneM2M provide a framework to support a variety of applications and services such as smart cities, smart grids, connected cars, home automation, security and health. In this regard, oneM2M has developed a set of standards defining a single horizontal platform for data exchange and sharing among all the applications. Applications across different industrial sections may also be considered by oneM2M. Like an operating system, oneM2M provides a framework connecting different technologies, thereby creating distributed software layers facilitating unification. Distributed software layers are implemented in a common services layer between M2M applications and communication Hardware/Software (HW/SW) rendering data transmission. For example, a common services layer may be a part of a layered structure illustrated in FIG. 1.

FIG. 1 is a view illustrating a layered structure of a Machine-to-Machine (M2M) system according to the present disclosure. Referring to FIG. 1, a layered structure of an M2M system may include an application layer 110, a common services layer 120 and a network services layer 130. Herein, the application layer 110 may be a layer operating based on a specific application. For example, an application may be a fleet tracking application, a remote blood sugar monitoring application, a power metering application or a controlling application. In other words, an application layer may be a layer for a specific application. Herein, an entity operating based on an application layer may be an application entity (AE).

The common services layer 120 may be a layer for a common service function (CSF). For example, the common services layer 120 may be a layer for providing common services like data management, device management, M2M service subscription management and location service. For example, an entity operating based on the common services layer 120 may be a common service entity (CSE).

The common services layer 120 may provide a set of services that are grouped into CSFs according to functions.

A multiplicity of instantiated CSFs constitutes CSEs. CSEs may interface with applications (for example, application entities or AEs in the terminology of oneM2M), other CSEs and base networks (for example, network service entities or NSEs in the terminology of oneM2M). The network services layer 130 may provide the common services layer 120 with services such as device management, location service and device triggering. Herein, an entity operating based on the network layer 120 may be a network service entity (NSE).

Figure 2:
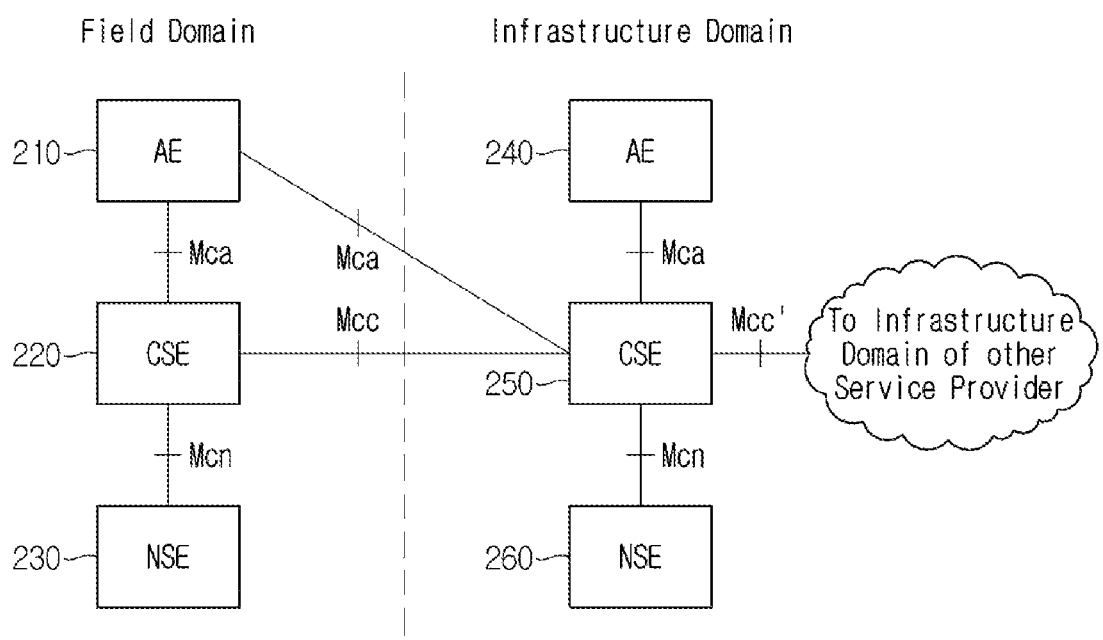
FIG. 2 illustrates a reference point in an M2M system according to the present disclosure.

FIG. 2 is a view illustrating reference points in an M2M system according to the present disclosure. Referring to FIG. 2, an M2M system structure may be distinguished into a field domain and an infrastructure domain. Herein, in each domain, each of the entities may perform communication through a reference point (for example, Mca or Mcc). For example, a reference point may indicate a communication flow between each entity. In particular, referring to FIG. 2, the reference point Mca between AE 210 or 240 and CSE 220 or 250, the reference point Mcc between different CSEs and Mcn reference point between CSE 220 or 250 and NSE 230 or 260 may be set.

Figure 3:
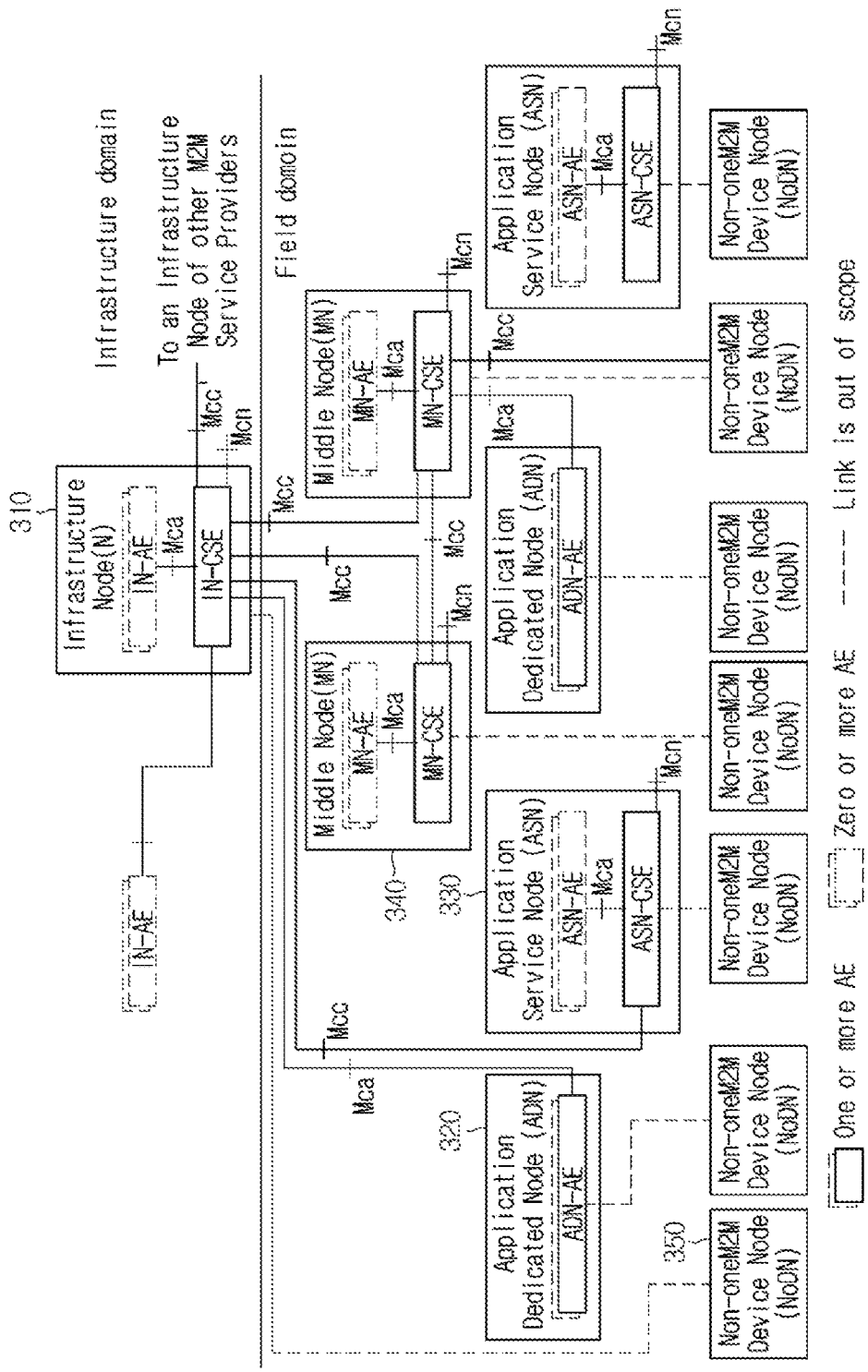
FIG. 3 illustrates each node in an M2M system according to the present disclosure.

FIG. 3 is a view illustrating each node in an M2M system according to the present disclosure. Referring to FIG. 3, an infrastructure domain of a specific M2M service provider may provide a specific infrastructure node (IN) 310. Herein, the CSE of the IN may be configured to perform communication based on the AE and the reference point Mca of another infrastructure node. In particular, one IN may be set for each M2M service provider. In other words, the IN may be a node that performs communication with the M2M terminal of another infrastructure based on an infrastructure structure. In addition, for example, conceptually, a node may be a logical entity or a software configuration.

Next, an application dedicated node (ADN) 320 may be a node including at least one AE but not CSE. In particular, an ADN may be set in the field domain. In other words, an ADN may be a dedicated node for AE. For example, an ADN may be a node that is set in an M2M terminal in hardware. In addition, the application service node (ASN) 330 may be a node including one CSE and at least one AE. ASN may be set in the field domain. In other words, it may be a node including AE and CSE. In particular, an ASN may be a node connected to an IN. For example, an ASN may be a node that is set in an M2M terminal in hardware.

In addition, a middle node (MN) 340 may be a node including a CSE and including zero or more AEs. In particular, the MN may be set in the field domain. An MN may be connected to another MN or IN based on a reference point. In addition, for example, an MN may be set in an M2M gateway in hardware. As an example, a non-M2M terminal node 350 (Non-M2M device node, NoDN) is a node that does not include M2M entities. It may be a node that performs management or collaboration together with an M2M system.

Figure 4:
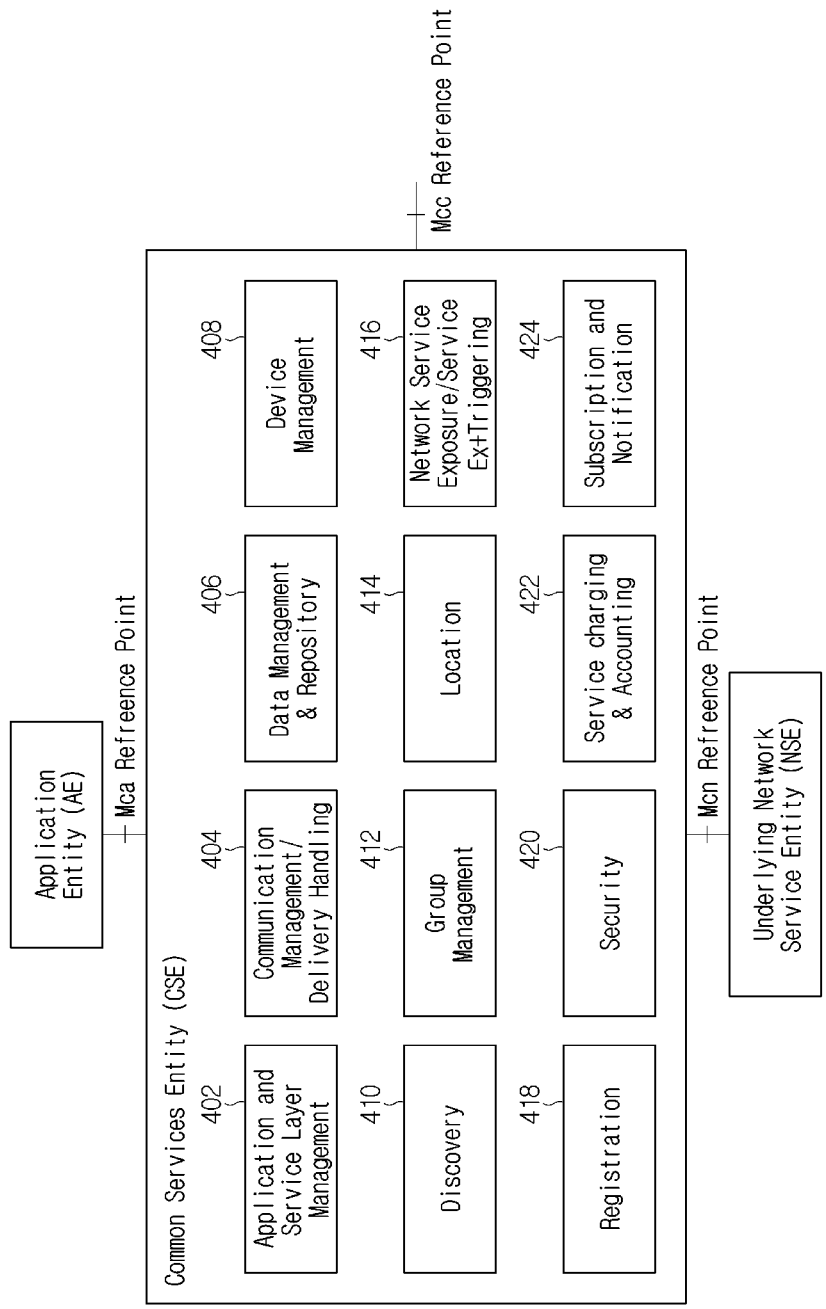
FIG. 4 illustrates a common service function in an M2M system according to the present disclosure.

FIG. 4 is a view illustrating a common service function in an M2M system according to the present disclosure. Referring to FIG. 4, common service functions may be provided. For example, a common service entity may provide at least one or more CSFs among application and service layer management 402, communication management and delivery handling 404, data management and repository 406, device management 408, discovery 410, group management 412, location 414, network service exposure/service execution and triggering 416, registration 418, security 420, service charging and accounting 422, service session management and subscription/notification 424. At this time, M2M terminals may operate based on a common service function. In addition, a common service function may be possible in other embodiments and is not limited to the above-described exemplary embodiment.

The application and service layer management 402 CSF provides management of AEs and CSEs. The application and service layer management 402 CSF includes not only the configuring, problem solving and upgrading of CSE functions but also the capability of upgrading AEs. The communication management and delivery handling 404 CSF provides communications with other CSEs, AEs and NSEs. The communication management and delivery handling 404 CSF are configured to determine at what time and through what connection communications are to be delivered, and also determine to buffer communication requests to deliver the communications later, if necessary and permitted.

The data management and repository 406 CSF provides data storage and transmission functions (for example, data collection for aggregation, data reformatting, and data storage for analysis and sematic processing). The device management 408 CSF provides the management of device capabilities in M2M gateways and M2M devices.

The discovery 410 CSF is configured to provide an information retrieval function for applications and services based on filter criteria. The group management 412 CSF provides processing of group-related requests. The group management 412 CSF enables an M2M system to support bulk operations for many devices and applications. The location 414 CSF is configured to enable AEs to obtain geographical location information.

The network service exposure/service execution and triggering 416 CSF manages communications with base networks for access to network service functions. The registration 418 CSF is configured to provide AEs (or other remote CSEs) to a CSE. The registration 418 CSF allows AEs (or remote CSE) to use services of CSE. The security 420 CSF is configured to provide a service layer with security functions like access control including identification, authentication and permission. The service charging and accounting 422 CSF is configured to provide charging functions for a service layer. The subscription/notification 424 CSF is configured to allow subscription to an event and notifying the occurrence of the event.

Figure 5:
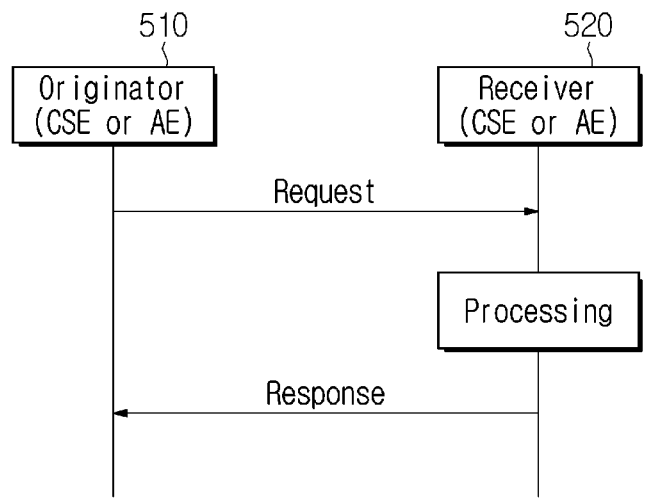
FIG. 5 illustrates a method in which an originator and a receiver exchange a message in an M2M system according to the present disclosure.

FIG. 5 is a view illustrating that an originator and a receiver exchange a message in an M2M system according to the present disclosure. Referring to FIG. 5, the originator 501 may be configured to transmit a request message to the receiver 520. In particular, the originator 510 and the receiver 520 may be the above-described M2M terminals. However, the originator 510 and the receiver 520 are not limited to M2M terminals but may be other terminals. They are not limited to the above-described exemplary embodiment. In addition, for example, the originator 510 and the receiver 520 may be nodes, entities, servers or gateways, which are described above. In other words, the originator 510 and the receiver 520 may be hardware or software configurations and are not limited to the above-described embodiment.

Herein, for example, a request message transmitted by the originator 510 may include at least one parameter. Additionally, a parameter may be a mandatory parameter or an optional parameter. For example, a parameter related to a transmission terminal, a parameter related to a receiving terminal, an identification parameter and an operation parameter may be mandatory parameters. In addition, optional parameters may be related to other types of information. In particular, a transmission terminal-related parameter may be a parameter for the originator 510. In addition, a receiving terminal-related parameter may be a parameter for the receiver 520. An identification parameter may be a parameter required for identification of each other.

Further, an operation parameter may be a parameter for distinguishing operations. For example, an operation parameter may be set to any one among Create, Retrieve, Update, Delete and Notify. In other words, the parameter may aim to distinguish operations. In response to receiving a request message from the originator 510, the receiver 520 may be configured to process the message. For example, the receiver 520 may be configured to perform an operation included in a request message. For the operation, the receiver 520 may be configured to determine whether a parameter is valid and authorized. In particular, in response to determining that a parameter is valid and authorized, the receiver 520 may be configured to check whether there is a requested resource and perform processing accordingly.

For example, in case an event occurs, the originator 510 may be configured to transmit a request message including a parameter for notification to the receiver 520. The receiver 520 may be configured to check a parameter for a notification included in a request message and may perform an operation accordingly. The receiver 520 may be configured to transmit a response message to the originator 510.

A message exchange process using a request message and a response message, as illustrated in FIG. 5, may be performed between AE and CSE based on the reference point Mca or between CSEs based on the reference point Mcc. In other words, the originator 510 may be AE or CSE, and the receiver 520 may be AE or CSE. According to an operation in a request message, such a message exchange process as illustrated in FIG. 5 may be initiated by either AE or CSE.

A request from a requestor to a receiver through the reference points Mca and Mcc may include at least one mandatory parameter and at least one optional parameter. In other words, each defined parameter may be either mandatory or optional according to a requested operation. For example, a response message may include at least one parameter among those listed in Table 1 below.

TABLE 1

| Response message parameter/success or not |
|---|
| Response Status Code - successful, unsuccessful, ack |
| Request Identifier - uniquely identifies a Request message |
| Content - to be transferred |
| To - the identifier of the Originator or the Transit CSE that sent the corresponding non-blocking request |
| From - the identifier of the Receiver |
| Originating Time stamp - when the message was built |
| Result Expiration Timestamp - when the message expires |
| Event Category - what event category shall be used for the response message |
| Content Status |
| Content Offset |
| Token Request Information |
| Assigned Token Identifiers |
| Authorization Signature Request Information |
| Release Version Indicator - the oneM2M release version that this response message conforms to |

A filter criteria condition, which can be used in a request message or a response message, may be defined as in Table 2 and Table 3 below.

TABLE 2

| Condition tag | Multi-plicity | Description |
|---|---|---|
| | | Matching Conditions |
| createdBefore | 0 . . . 1 | The creationTime attribute of the matched resource is chronologically before the specified value. |
| createdAfter | 0 . . . 1 | The creationTime attribute of the matched resource is chronologically after the specified value. |
| modifiedSince | 0 . . . 1 | The lastModifiedTime attribute of the matched resource is chronologically after the specified value. |
| unmodifiedSince | 0 . . . 1 | The lastModifiedTime attribute of the matched resource is chronologically before the specified value. |
| stateTagSmaller | 0 . . . 1 | The stateTag attribute of the matched resource is smaller than the specified value. |
| stateTagBigger | 0 . . . 1 | The stateTag attribute of the matched resource is bigger than the specified value. |
| expireBefore | 0 . . . 1 | The expirationTime attribute of the matched resource is chronologically before the specified value. |
| expireAfter | 0 . . . 1 | The expirationTime attribute of the matched resource is chronologically after the specified value. |
| labels | 0 . . . 1 | The labels attribute of the matched resource matches the specified value. |
| labelsQuery | 0 . . . 1 | The value is an expression for the filtering of labels attribute of resource when it is of key-value pair format. The expression is about the relationship between label-key and label-value which may include equal to or not equal to, within or not within a specified set etc. For example, label-key equals to label value, or label-key within {label-value 1, label-value2}. Details are defined in [3] |
| childLabels | 0 . . . 1 | A child of the matched resource has labels attributes matching the specified value. The evaluation is the same as for the labels attribute above. Details are defined in [3]. |
| parentLabels | 0 . . . 1 | The parent of the matched resource has labels attributes matching the specified value. The evaluation is the same as for the labels attribute above. Details are defined in [3]. |
| resourceType | 0 . . . n | The resourceType attribute of the matched resource is the same as the specified value. It also allows differentiating between normal and announced resources. |
| childResourceType | 0 . . . n | A child of the matched resource has the resourceType attribute the same as the specified value. |
| parentResourceType | 0 . . . 1 | The parent of the matched resource has the resourceType attribute the same as the specified value. |
| sizeAbove | 0 . . . 1 | The contentSize attribute of the <contentInstance> matched resource is equal to or greater than the specified value. |
| sizeBelow | 0 . . . 1 | The contentSize attribute of the <contentInstance> matched resource is smaller than the specified value. |
| contentType | 0 . . . n | The contentInfo attribute of the <contentInstance> matched resource matches the specified value. |
| attribute | 0 . . . n | This is an attribute of resource types (clause 9.6). Therefore, a real tag name is variable and depends on its usage and the value of the attribute can have wild card*. E.g. creator of container resource type can be used as a filter criteria tag as "creator = Sam", "creator = Sam*", "creator = Sam". |
| childAttribute | 0 . . . n | A child of the matched resource meets the condition provided. The evaluation of this condition is similar to the attribute matching condition above. |
| parentAttribute | 0 . . . n | The parent of the matched resource meets the condition provided. The evaluation of this condition is similar to the attribute matching condition above. |
| semanticsFilter | 0 . . . n | Both semantic resource discovery and semantic query use semanticsFilter to specify a query statement that shall be specified in the SPARQL querylanguage [5]. When a CSE receives a RETRIEVE request including a semanticsFilter, and the Semantic Query Indicator parameter is also present in the request, the request shall be processed as a semantic query; otherwise, the request shall be processed as a semantic resource discovery.<br>In the case of semantic resource discovery targeting a specific resource, if the semantic description contained in the <semanticDescriptor> of a child resource matches the semanticFilter, the URI of this child resource will be included in the semantic resource discovery result.<br>In the case of semantic query, given a received semantic query request and its query scope, the SPARQL query statement shall be executed over aggregated semantic information collected from the semantic resource(s) in the query scope and the produced output will be the result of this semantic query.<br>Examples for matching semantic filters in SPARQL to semantic descriptions can be found in [i.28]. |
| filterOperation | 0 . . . 1 | Indicates the logical operation (AND/OR) to be used for different condition tags. The default value is logical AND. |
| contentFilterSyntax | 0 . . . 1 | Indicates the Identifier for syntax to be applied for content-based discovery. |
| contentFilterQuery | 0 . . . 1 | The query string shall be specified when contentFilterSyntax parameter is present. |

TABLE 3

| Condition tag | Multi-plicity | Description |
|---|---|---|
| | | Filter Handling Conditions |
| filterUsage | 0 . . . 1 | Indicates how the filter criteria is used. If provided, possible values are 'discovery' and 'IPEOnDemandDiscovery'.<br>If this parameter is not provided, the Retrieve operation is a generic retrieve operation and the content of the child resources fitting the filter criteria is returned.<br>If filterUsage is 'discovery', the Retrieve operation is for resource discovery (clause 10.2.6), i.e. only the addresses of the child resources are returned.<br>If filterUsage is 'IPEOnDemandDiscovery', the other filter conditions are sent to the IPE as well as the discovery Originator ID. When the IPE successfully generates new resources matching with the conditions, then the resource address(es) shall be returned. This value shall only be valid for the Retrieve request targeting an <AE> resource that represents the IPE. |
| limit | 0 . . . 1 | The maximum number of resources to be included in the filtering result. This may be modified by the Hosting CSE. When it is modified, then the new value shall be smaller than the suggested value by the Originator. |
| level | 0 . . . 1 | The maximum level of resource tree that the Hosting CSE shall perform the operation starting from the target resource (i.e. To parameter). This shall only be applied for Retrieve operation. The level of the target resource itself is zero and the level of the direct children of the target is one. |
| offset | 0 . . . 1 | The number of direct child and descendant resources that a Hosting CSE shall skip over and not include within a Retrieve response when processing a Retrieve request to a targeted resource. |
| applyRelativePath | 0 . . . 1 | This attribute contains a resource tree relative path (e.g. . . . /tempContainer/LATEST). This condition applies after all the matching conditions have been used (i.e. a matching result has been obtained). The attribute determines the set of resource(s) in the final filtering result. The filtering result is computed by appending the relative path to the path(s) in the matching result. All resources whose Resource-IDs match that combined path(s) shall be returned in the filtering result. If the relative path does not represent a valid resource, the outcome is the same as if no match was found, i.e. there is no corresponding entry in the filtering result. |

A response to a request for accessing a resource through the reference points Mca and Mcc may include at least one mandatory parameter and at least one optional parameter. In other words, each defined parameter may be either mandatory or optional according to a requested operation or a mandatory response code. For example, a request message may include at least one parameter among those listed in Table 4 below.

TABLE 4

| | Request message parameter |
|---|---|
| Mandatory | Operation - operation to be executed! CREAT, Retrieve, Update, Delete, Notify<br>To - the address of the target resource on the target CSE<br>From - the identifier of the message Originator<br>Request Identifier - uniquely identifies a Request message |
| Operation dependent | Content - to be transferred<br>Resource Type - of resource to be created |
| Optional | Originating Timestamp - when the message was built<br>Request Expiration Timestamp - when the request message expires<br>Result Expiration Timestamp - when the result message expires<br>Operational Execution Time - the time when the specified operation is to be executed by the target CSE<br>Response Type - type of response that shall be sent to the Originator<br>Result Persistence - the duration for which the reference containing the responses is to persist<br>Result Content - the expected components of the result<br>Event Category - indicates how and when the system should deliver the message<br>Delivery Aggregation - aggregation of requests to the same target CSE is to be used<br>Group Request Identifier - Identifier added to the group request that is to be fanned out to each member of the group<br>Group Request Target Members-indicates subset of members of a group<br>Filter Criteria - conditions for filtered retrieve operation<br>Desired Identifier Result Type - format of resource identifiers returned<br>Token Request Indicator - indicating that the Originator may attempt Token Request procedure (for Dynamic Authorization) if initiated by the Receiver<br>Tokens - for use in dynamic authorization<br>Token IDs - for use in dynamic authorization<br>Role IDs - for use in role based access control<br>Local Token IDs - for use in dynamic authorization<br>Authorization Signature Indicator - for use in Authorization Relationship Mapping<br>Authorization Signature -for use in Authorization Relationship Mapping<br>Authorization Relationship Indicator - for use in Authorization Relationship Mapping<br>Semantic Query Indicator - for use in semantic queries |

TABLE 4-continued

Request message parameter

Release Version Indicator - the oneM2M release version that this request message conforms to.
Vendor Information A normal resource includes a complete set of representations of data constituting the base of information to be managed. Unless qualified as either "virtual" or "announced", the resource types in the present document are normal resources. A virtual resource is used to trigger processing and/or a retrieve result. However, a virtual resource does not have a permanent representation in a CSE. An announced resource contains a set of attributes of an original resource. When an original resource changes, an announced resource is automatically updated by the hosting CSE of the original resource. The announced resource contains a link to the original resource. Resource announcement enables resource discovery. An announced resource at a remote CSE may be used to create a child resource at a remote CSE, which is not present as a child of an original resource or is not an announced child thereof.

To support resource announcement, an additional column in a resource template may specify attributes to be announced for inclusion in an associated announced resource type. For each announced <resourceType>, the addition of suffix "Annc" to the original <resourceType> may be used to indicate its associated announced resource type. For example, resource <containerAnnc> may indicate the announced resource type for <container> resource, and <groupAnnc> may indicate the announced resource type for <group> resource.

In an M2M system according to an embodiment of the present disclosure, various IoT devices may perform communication. IoT devices have various structures according to types and uses. Herein, some IoT devices may include numerous parts. Constitutional parts of an IoT device have their own life, and suitable replacement of a dead part is necessary for the normal operation of the IoT device. Nevertheless, since numerous IoT devices are used together, it is not easy to manage information on replacement of parts such as lifespans of parts of each IoT device. As an example, a vehicle, which is a type of IoT device, may include various parts as shown in Table 5 below. As in the example of Table 5 below, parts have different lifespans.

TABLE 5

| Types of parts | Lifespans (replacement cycles) |
| --- | --- |
| Battery | 2 to 3 years |
| Wiper blade | 1 year |
| Oxygen sensor | Every 80,000 km of driving distance |
| Tire position | 5 years |
| Timing belt | Every 80,000 km of driving distance |
| Brake pad | Every 40,000 km of driving distance |
| Various fuses | Anytime a defect is found |

Although the management of parts is a challenging job, it is very important to know what parts are included in a device and how often and when those parts are to be replaced. As an example, the battery of an electric vehicle has a typical lifespan of 7 to 10 years. When getting close to its lifespan, the charge performance of battery is lowered to 70 to 80% as compared to the expected level, and this results in the concomitant efficiency degradation of an electric vehicle. Accordingly, for efficient use of a device, replacing the parts of the device at the right time is very important to the user. Each part of a device needs to be removed or replaced, when it completes the lifespan or its performance is degraded. However, as various IoT devices include numerous parts, it is difficult to replace those parts as needed by intuitively checking information regarding, for example, when and how often the parts are to be replaced. In the era of IoT, numerous constitutional parts of IoT devices need to be managed at a system level in order to keep pace with the automation of those IoT devices. As an example, in case the serial number of a device and/or a part is used as an authentication security key, when the device and/or the part is replaced, the authentication security key should be upgraded or a new authentication security key should be registered. In this case, an IoT part replacement system of the present disclosure may also be utilized.

Accordingly, the present disclosure proposes an efficient management system for parts using an IoT platform. For business purposes, an IoT device management service provider may use information on an IoT device and parts through an IoT platform. Also, based on the information shown in Table above, the service provider may check information on the current status of an IoT device and thus provide better device performance. That is, the present disclosure performs integrated management of information on start time of using parts and performance of parts and replacement-related information including defect, repair, reuse and replacement and thus provides an effect of maintaining the best performance of devices through such efficient management of parts.

Figure 6:
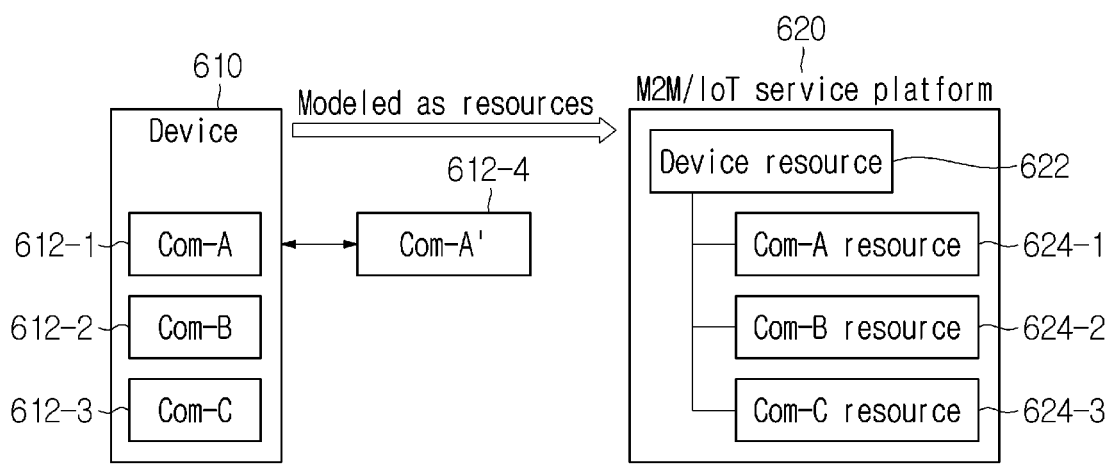
FIG. 6 illustrates schematically a part replacement system for an IoT device in an M2M system according to the present disclosure.

FIG. 6 illustrates a concept of managing information on parts of a device in an M2M system according to the present disclosure.

Referring to FIG. 6, a device 610 includes a plurality of parts 612-1, 612-2 and 612-3, an M2M/IoT service platform (MSP) 620 manages information on the parts 612-1, 612-2 and 612-3. The MSP 620 generates and manages a device resource 622.

The device 610 is an IoT device including replaceable parts. As an example, being an electric vehicle, the device may control other devices in the vehicle and manage the conditions of internal parts. The device 610 includes Com (component)-A 612-1, Com-B 612-2 and Com-C 612-3 as parts. Com-A 612-1, Com-B 612-2 and Com-C 612-3 are replaceable parts of the device 610. Com-A' 612-4 of the device 610 is a part capable of replacing Com-A 612-1. As an example, Com-A 612-1, Com-B 612-2 and Com-C 612-3 may include the battery, timing belt and brake pad of an electric vehicle, respectively. Com-A' 612-4 may be a new battery as replacement.

The MSP 620 is a platform that provides an M2M service like a gateway and a platform and enables communication between M2M services. According to various embodiments, a parts information management service is provided through the MSP 620. The MSP 620 may be called IoT platform, M2M service provider, or IoT service provider. An operation subject of the MSP 620 may be a service layer or CSE, which provides the service.

The device resource 622 is a resource related to the device 610, and a Com-A resource 624-1, a Com-B resource 624-2 and a Com-C resource 624-3 are resources which are associated with Com-A 612-1, Com-B 612-2 and Com-C 612-3 respectively, which are the parts of the device 610. The device resource 622 includes the Com-A resource 624-1, the Com-B resource 624-2 and the Com-C resource 624-3 which are resources for the parts of a device (e.g., Com-A 612-1, Com-B 612-2, Com-C 612-3).

The MSP 620 may generate the device resource 622 at a request of the device 610 or at a request of another device. That is, the device 610 or another device provides information on parts of the device 610 to the MSP 620, and the MSP 620 may register the device resource 622 based on the provided information. That is, the device 610 or another device provides information on parts to the MSP 620 that provides a service associated with management of parts. Accordingly, the device 610, Com-A 612-1, Com-B 612-2 and Com-C 612-3 may be modeled as resources in the MSP 620.

When the device resource 622 is registered, the MSP 620 may manage parts information of the device 610 through the device resource 622. Herein, the parts information is information on a corresponding part, which is included in the Com-A resource 624-1, the Com-B resource 624-2 and the Com-C resource 624-3 in the device resource 622, and may include at least one of: the lifespan of the part, the number of replacements of the part, time of previous replacement, of a maximum number of part replacements allowed. According to various embodiments, parts information may be defined in various ways.

Based on the registered device resource 622, the MSP 620 may provide a parts management service. The MSP 620 may determine replacement time of a managed part based on information on the part included in the device resource 622 and notify the replacement time to the device 610. To this end, the information on the part may further include information on a target to which a recommendation of the part replacement is to be transmitted. Accordingly, when a part is replaced, the MSP 620 may manage information on the part by updating information on part replacement history included in the device resource 622.

As described above, according to an embodiment of the present disclosure, information on replaceable parts included in a device may be managed by an IoT platform. A platform that manages information on parts (hereinafter referred to as "parts management platform") may interact with an AE requesting registration of a device resource and an AE that becomes a demander of a parts management service. Hereinafter procedures for a parts management service will be described.

Figure 7:
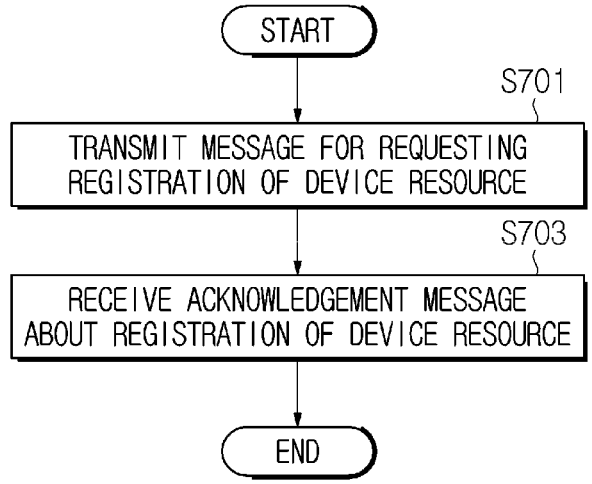
FIG. 7 is a view illustrating an operating method of a device for generating an IoT device resource in an M2M system according to the present disclosure.

FIG. 7 illustrates an example procedure of requesting registration of a resource for a part in an M2M system according to the present disclosure. FIG. 7 exemplifies a method for operating a device including an AE which requests registration of a device resource in a parts management platform. In the description referring to FIG. 7, the operation subject is referred to as "device".

Referring to FIG. 7, at step S701, a device transmits a message for requesting registration of a device resource for a target device. Specifically, the device requests a parts management platform to generate a resource including information on a part of the target device. To this end, the message may include information on the target device (e.g., identification information, address information and the like) and information on parts included in the target device (e.g., a list of parts, types of each part, current status of parts and the like).

At step S703, the device receives an acknowledgement message for registration of the device resource. That is, the device receives, from the parts management platform, the acknowledgement message for notifying that the resource including information on the part of the target device is generated. When the parts management platform fails to register the resource, the acknowledgement message for notifying the completion of registration may not be received.

Figure 8:
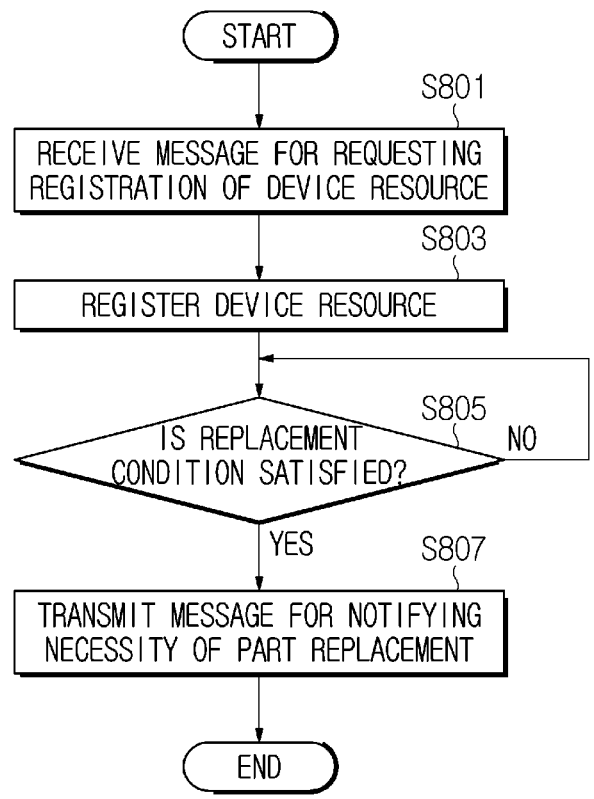
FIG. 8 is a view illustrating an operating method of a device for managing information related to parts replacement in an M2M system according to the present disclosure.

FIG. 8 is a view illustrating an operating method of a device for managing information related to parts replacement in an M2M system according to the present disclosure. FIG. 8 exemplifies a method for operating a device including a service layer or CSE which provides a parts management platform. In the description referring to FIG. 8, the operation subject is referred to as "device".

Referring to FIG. 8, at step S801, a device receives a message for requesting registration of a device resource for a target device. Specifically, the device requests a parts management platform to generate a resource including information on a part of the target device. To this end, the message may include information on the target device (e.g., identification information, address information and the like) and information on parts included in the target device (e.g., a list of parts, types of each part, current status of parts and the like).

At step S803, the device registers the device resource for the target device. Specifically, the device may generate the device resource and set initial values of attributes included in the device resource based on information included in the received message. The device may manage information associated with replacement of parts of the target device through the registered resource. Herein, the device resource may include a resource (hereinafter referred to as "part resource") for at least one part included in the target device. The part resource may include at least one of: information on a replacement condition of a part, information on the replacement history of a part, and/or information on a target to which a recommendation for replacing a part will be notified.

At step S805, the device determines whether or not a condition for replacing a part is satisfied. Based on information included in the device resource, the device may check the condition for replacing the part and determine whether or not the part satisfies the condition.

According to an embodiment, the device resource may include information indicating time of necessary replacement, and in this case, the device determines whether or not the time of necessary replacement has arrived.

When the condition for replacing a part is satisfied, at step S807, the device transmits a message for notifying that the part needs to be replaced. That is, the device recommends the replacement of the part corresponding to the satisfied condition to the target device. Herein, the message may include identification information of the part corresponding to the satisfied condition.

Figure 9:
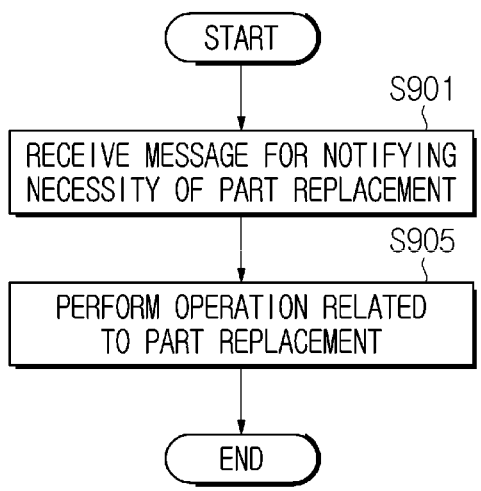
FIG. 9 is a view illustrating an operating method of an application device for transmitting current part information of a device and performing a part replacement procedure in an M2M system according to the present disclosure.

FIG. 9 is a view illustrating an operating method of a device for transmitting current part information of a device and performing a part replacement procedure in an M2M system according to the present disclosure. The operation subject of FIG. 9 may be an AE of the device that transmits current part information and performs a replacement procedure. In the description below, the operation subject of the procedure in FIG. 9 is referred to as 'device'.

Referring to FIG. 9, at step S901, the device receives a message for notifying that the replacement of a part is needed. That is, the device receives a recommendation for replacing at least one part from a parts management platform. The message is transmitted as the parts management platform determines that a condition for part replacement is satisfied, and the message may include identification information of at least one part corresponding to the satisfied replacement condition.

At step S903, the device may perform an operation associated with part replacement. The operation associated with part replacement may be defined in various ways. According to an embodiment, the device may output an alarm (e.g., message, warning sound, warning light) for notifying the necessity of part replacement to a user. According to another embodiment, the device may check whether or not a part is replaced and send information on the completed replacement of the part back to the parts management platform.

As in the above-described various embodiments, a resource for a part may be registered and utilized. The resource for the part may include at least one attribute related to the replacement of the part. For example, the at least one attribute may include at least one of: information on a condition for replacing the part (e.g., threshold usage time, time of necessary replacement), information on the replacement history of the part (e.g., number of replacements, time of replacement), and/or information on a procedure of recommending the replacement of the part (e.g., address of AE to which the recommendation of replacement will be sent). Specifically, the resource for the part may include at least one of the attributes illustrated in Table 6 below.

TABLE 6

| Attributes | Descriptions |
| --- | --- |
| numberOfReplacement | This attribute shows the number of replacements that have happened. |
| limitedNumberOfReplacement | This attribute indicates a maximum possible number of replacements (1, 2, 3, . . . integer value). |
| replacedTime | This attribute is a list that shows when a replacement happened. |
| replacementCondition | This attribute includes conditions for replacement (Location, time, distance, etc. can be used to form a condition. It describes where and when a part replacement happens). |
| replacementNoti | This attribute indicates where to notify that a condition for replacementCondition is satisfied. |

Figure 10:
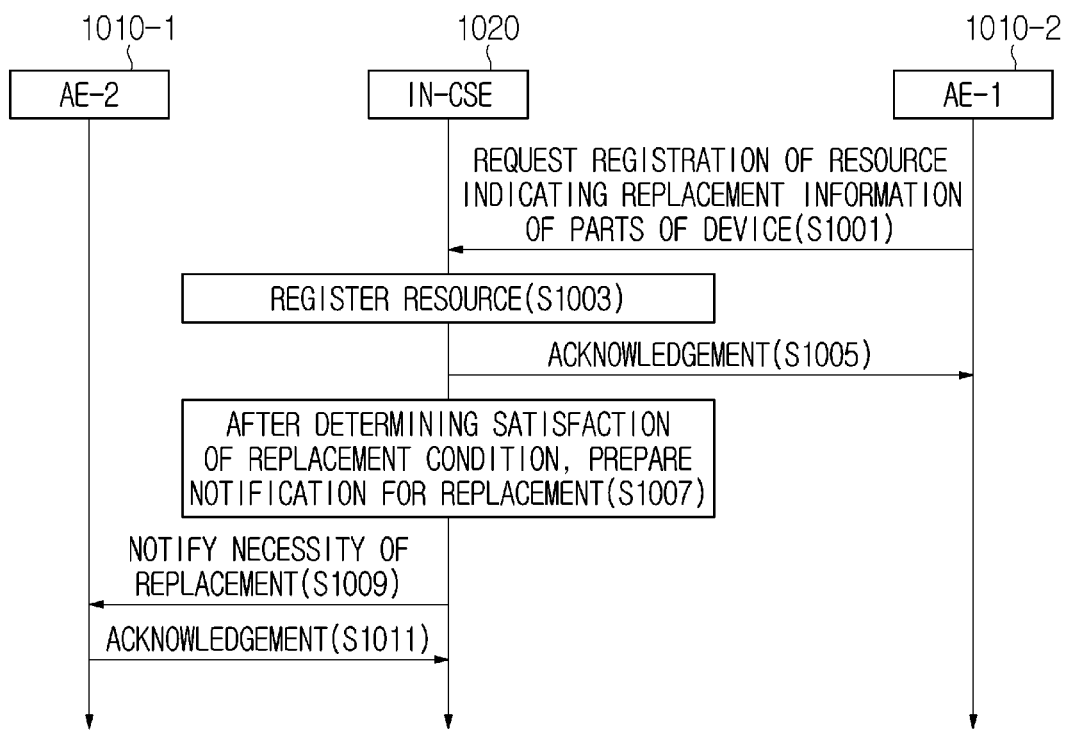
FIG. 10 is a view illustrating an example procedure of notifying replacement of a part in an M2M system according to the present disclosure.

FIG. 10 is a view illustrating an example procedure of managing information on replaceable parts in an M2M system according to the present disclosure. FIG. 10 exemplifies the exchange of signals among AE-1 1010-1, IN-CSE 1020 and AE-2 1010-2. Here, AE-2 1010-2 is an entity representing a device including replaceable parts.

Referring to FIG. 10, at step S1001, AE-1 1010-1 requests registration of a resource including information associated with the parts of a target device. That is, AE-1 1010-1 transmits a message, which requests registration of a resource indicating replacement information of various parts, to IN-CSE 1020. The message may include information on the target device and/or information on parts. In addition, the request message may further include information notifying a condition for part replacement.

At step S1003, IN-CSE 1020 registers the resource. That is, based on the information included in the message received from AE-1 1010-1, IN-CSE 1020 may generate a resource for the target device and a resource for each part and set values of attributes included in the resources. At step S1005, IN-CSE 1020 transmits an acknowledgement message, which notifies the completion of resource registration, to AE-1 1010-1. That is, when resource registration is completed, IN-CSE 1020 notifies the completion of resource registration to AE-1 1010-1.

At step S1007, IN-CSE 1020 determines that a condition for part replacement is satisfied and prepares a notification for replacing a part. That is, when the condition for part replacement is satisfied, IN-CSE 1020 generates a notification message that informs AE-2 1010-2 of the necessity of replacement including information on the satisfaction of condition. For example, IN-CSE 1020 may prepare a notification to an application which is addressed by the attribute replacementNoti. The condition for part replacement is included in a registered resource and may be present for each part. IN-CSE 1020 may determine whether or not a part needs to be replaced by comparing the condition for part replacement and a current status.

At step S1009, IN-CSE 1020 transmits a notification about the necessity of part replacement to AE-2 1010-2. At step S1011, AE-2 1010-2 transmits an acknowledgement message for the notification to IN-CSE 1020. Herein, the acknowledgement message may be a response to the reception of the notification or a response to the completed replacement of a part indicated by the notification.

As shown in the above-described embodiments, a resource (e.g., device resource, part resource) related to a part may be registered, and the necessity of replacement may be notified based on the registered resource. In addition, in response to the replacement of a part, a resource for the part may be updated. To this end, according to an embodiment, the target device may send a message, which notifies the completion of part replacement, as feedback to a parts management platform that manages the resource. In other words, when the part is replaced after the replacement of the part is recommended, a vehicle application included in the target device generates and transmits information on the part replacement to the parts management platform.

To this end, a device including the part may provide a UI for setting according to a change of part in the device. Through the UI, the device may obtain information on the change of the part input by a user and transmit the obtained information to the parts management platform. In response to this, the parts management platform may update change-related information (e.g., attribute indicating the number of replacements, attribute indicating when replacement is performed) within a corresponding part resource included in the device resource. An embodiment of updating change-related information is described below with reference to FIG. 11.

Figure 11:
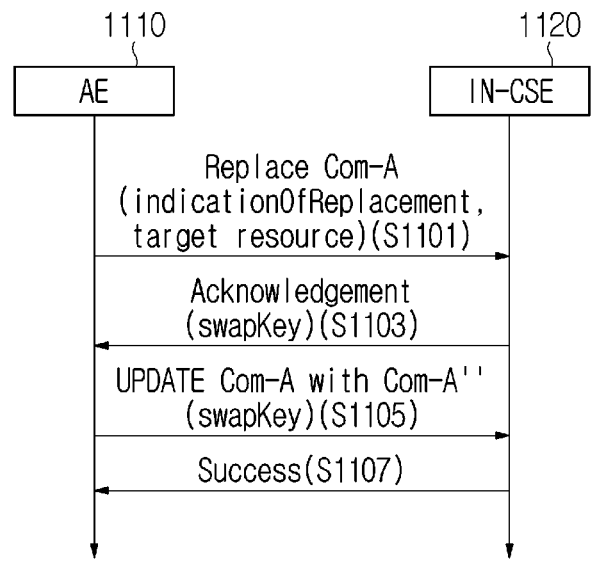
FIG. 11 is a view illustrating an example procedure of replacing a part in an M2M system according to the present disclosure.

FIG. 11 is a view illustrating an example procedure of updating part replacement information in an M2M system according to the present disclosure. FIG. 11 exemplifies the exchange of signals between AE 1110 and IN-CSE 1120. AE 1110 represents a device including parts, and IN-CSE 1120 is included in a device managing a resource.

Referring to FIG. 11, at step S1101, AE 1110 transmits information on a part to be replaced to IN-CSE 1120. For example, AE 1110 may transmit information indicating that the Com-A part of a device should be replaced. This procedure may be understood as a procedure in which AE 1110 requests the replacement of a part to IN-CSE 1120. According to an embodiment, the information on a part to be replaced may include an attribute indicating the replacement of the part (e.g., indicationOfReplacement), an attribute indicating a resource related to the replaced part, and the like.

At step S1103, IN-CSE 1120 transmits an acknowledgement (ACK) message to AE 1110. The ACK message is transmitted as a response to the reception of the information on the part to be replaced. That is, IN-CSE 1120 confirms that a resource associated with the part to be replaced is registered, and notifies that the resource may be modified according to replacement. Herein, the ACK message may include an attribute (e.g., swapKey) including security key information.

At step S1105, AE 1110 transmits information on a part replacement result. Specifically, AE 1110 transmits a message for notifying that Com-A is replaced by Com-A". For example, when information on replacement (e.g., information on completion of replacement, a replaced part, and the like), which a user inputs through an UI, is acknowledged, AE 1110 may transmit the acknowledged information to IN-CSE 1120. Accordingly, IN-CSE 1120 may update a resource associated with Com-A (e.g., modification on replacement history information). Herein, information on the part replacement result may include an attribute (e.g., swapKey) including security key information. Through the security key information, it may be confirmed that AE 1110, which transmits the information on the part replacement result, is the same as the AE receiving the above ACK message.

At step S1107, IN-CSE 1120 transmits, to AE 1110, a message for notifying that updating the resource related to the part Com-A" is successful. That is, after completing the update of the resource related to the part based on the information received from AE 1110, IN-CSE 1120 notifies the completion of successful update.

The procedure described with reference to FIG. 11 may be implemented in various situations. According to an embodiment, in a situation where the replacement of a part is triggered by a parts management platform, the procedure of FIG. 11 may be performed to provide information on a replacement result as feedback. According to another embodiment, the procedure of FIG. 11 may be performed to trigger the replacement of a part by a device including the part. That is, even if there is no recommendation of the parts management platform, when a part is replaced according to a user's determination, replacement-related information may be provided to the parts management platform.

According to the above-described embodiments, based on a registered resource, the parts management platform determines whether or not a condition for part replacement is satisfied. Furthermore, based on information received from a target device including a part, a device may determine whether or not a condition is satisfied. In this case, the target device may transmit information on the status of a part to the parts management platform, and the parts management platform may determine whether or not a condition for replacement of the part is satisfied based on the status of the part which is confirmed by the received information.

Information on the status of a part may be defined in various ways according to the type of a device, the type of a part and the like. For example, in case a device is a vehicle and a part is a tire, information on the status of a part may include a mileage. As another example, in case a device is a vehicle and a part is a battery, information on the status of a part may include at least one of: the capacity of a fully charged battery, the period of use, or the rate of battery consumption.

Figure 12:
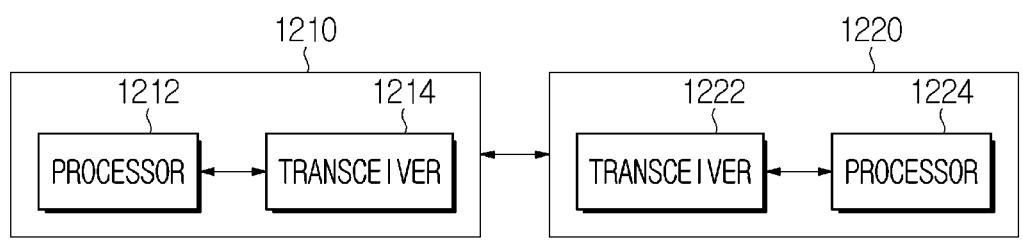
FIG. 12 illustrates a configuration of an M2M apparatus in an M2M system according to the present disclosure.

FIG. 12 illustrates a configuration of an M2M device in an M2M system according to the present disclosure. An M2M device 1210 or an M2M device 1220 illustrated in FIG. 12 may be understood as hardware functioning as at least one of: the above-described AE, CSE, or NSE.

Referring to FIG. 12, the M2M device 1210 may include a processor 1212 controlling a device and a transceiver 1214 transmitting and receiving a signal. Herein, the processor 1212 may control the transceiver 1214. In addition, the M2M device 1210 may communicate with another M2M device 1220. The another M2M device 1220 may also include a processor 1222 and a transceiver 1224, and the processor 1222 and the transceiver 1224 may perform the same function as the processor 1212 and the transceiver 1214.

As an example, the originator, the receiver, AE and CSE, which are described above, may be one of the M2M devices 1210 and 1220 of FIG. 12, respectively. In addition, the devices 1210 and 1220 of FIG. 12 may be other devices. As an example, the devices 1210 and 1220 of FIG. 12 may be communication devices, vehicles, or base stations. That is, the devices 1210 and 1220 of FIG. 12 refer to devices capable of performing communication and are not limited to the above-described embodiment.

According to the various embodiments described above, a user of a device or a service provider may use information on the device and parts for business purposes, and the service provider may provide better performance of a device by checking the current status of the device. That is, the present disclosure may provide an efficient parts management service through an integrated management system for information associated with part replacement and thus provide an effect of maximizing the performance of a device.

The various embodiments described above may be utilized as various scenarios. As an example, the above-described parts management platform may be applied to a car center that sells and manages vehicles.

As a place of selling and managing vehicles, a car center may provide a variety of services to customers. For example, for the purpose of safe driving, the car center may inform customers of when to replace a particular part. To this end, the car center may set up a business relationship with an M2M service provider, an M2M platform and the like, install an M2M/IoT sensor, an actuator and the like in a vehicle and register those parts to the M2M service provider.

A vehicle is a smart vehicle with M2M/IoT functions. An AE installed in the vehicle may transmit various types of vehicle information to the parts management platform and provide a vehicle owner with diagnostic information of the vehicle. The vehicle information may include information on vehicle parts. Also, the vehicle information may further include vehicle diagnostic information which is generated by the parts management platform based on the vehicle parts information. The diagnostic information may include the lifespan of each vehicle part, when the lifespan of each part ends and the part should be replaced, and the like.

A user, who purchases a vehicle, subscribes to a part replacement service through an IoT platform provided by a car center. The part replacement platform registers a vehicle resource, which is received from a resource generation device (generator), and vehicle information. As the vehicle is used, the battery performance of the vehicle is lowered to 50% and below. A vehicle application transmits the battery performance and other information on part replacement to the IoT platform. The IoT platform senses a situation requiring replacement by comparing replacement-related information, which is stored or set beforehand, and the information received from the vehicle application. When the IoT platform determines that replacement is needed, the IoT platform notifies a part replacement to the vehicle application. The vehicle application informs the user of the part replacement notification. When a part is replaced, the vehicle application stores replacement information and transmits the replacement information to the IoT platform.

As an example, in the case of an electric vehicle, the parts management platform may register a battery resource, a timing belt resource and a tire resource as device resources. Through the resources thus registered, the parts management platform receives information on the battery, timing belt and tires, which are the parts of the current vehicle, from a vehicle application. A vehicle resource registered in the parts management platform includes a part replacement condition. As an example, in case a vehicle resource includes a condition that the battery should be replaced after 7-year use or 7 years after replacement, when the current battery information transmitted from the vehicle application is 7 years, the parts management platform determines that the battery replacement condition is satisfied. As an example, in case a vehicle resource includes a condition that the battery should be replaced as the battery performance is lowered to 50% and below, when the current battery performance information transmitted from the vehicle application is 50% or below of the original performance, the parts management platform determines that the battery replacement condition is satisfied. As an example, when a replacement condition included in a registered resource is satisfied, the parts management platform may determine whether or not the part replacement condition is satisfied by checking information which is periodically transmitted through the vehicle application. As an example, the parts management platform may notify a replacement approval to a car center, and the car center may transmit a replacement notification to a user through a customer service platform which is operated by the car center. In addition, a device may notify the part replacement approval to the vehicle application so that the vehicle application may directly inform the user of the necessity of part replacement.

As an example, the device may update a part replacement condition. As an example, when many fuse components of a vehicle have been intensively replaced over a short period of time, for flooding or other reasons, it may be necessary to set a shorter replacement cycle for the parts than a usual replacement cycle for the ordinary vehicles. In this case, a vehicle application transmits information on the fuse components, which are intensively replaced over a short period of time, to the device. Through the received information, the vehicle may check the status of the vehicle and update information on part replacement including part replacement conditions.

The above-described exemplary embodiments of the present disclosure may be implemented by various means. For example, the exemplary embodiments of the present disclosure may be implemented by hardware, firmware, software, or a combination thereof.

The foregoing description of the exemplary embodiments of the present disclosure has been presented for those skilled in the art to implement and perform the disclosure. While the foregoing description has been presented with reference to the preferred embodiments of the present disclosure, it will be apparent to those skilled in the art that various modifications and variations can be made in the present disclosure without departing from the spirit or scope of the present disclosure as defined by the following claims.

Accordingly, the present disclosure is not intended to be limited to the exemplary embodiments shown herein but is to be accorded the widest scope consistent with the principles and novel features disclosed herein. In addition, while the exemplary embodiments of the present specification have been particularly shown and described, it is to be understood that the present specification is not limited to the above-described exemplary embodiments, but, on the contrary, it will be understood by those skilled in the art that various changes and modifications may be made without departing from the spirit and scope of the present specification as defined by the claims below, and such changes and modifications should not be individually understood from the technical thought and outlook of the present specification.

In this specification, both the disclosure and the method disclosure are explained, and the description of both disclosures may be supplemented as necessary. In addition, the present disclosure has been described with reference to exemplary embodiments thereof. It will be understood by those skilled in the art that various changes in form and details may be made therein without departing from the essential characteristics of the present disclosure. Therefore, the disclosed exemplary embodiments should be considered in an illustrative sense rather than in a restrictive sense. The scope of the present disclosure is defined by the appended claims rather than by the foregoing description, and all differences within the scope of equivalents thereof should be construed as being included in the present disclosure.

What is claimed is:

1. A method performed by a first device in a machine-to-machine (M2M) system, the method comprising:
receiving, from a third device, a first message for requesting registration of at least one resource related to a second device including a plurality of parts, the first message including information on replacement conditions for one or more parts of the second device;
generating and registering, by the first device, the at least one resource comprising information on the plurality of parts;
transmitting, to the second device, a second message for recommending replacement of a first part of the plurality of parts if a replacement condition for the first part is satisfied;
receiving, from the second device, a third message indicating replacement of the first part;
transmitting, to the second device, an acknowledgement message including a first security key;
receiving, from the second device, a part replacement result including information on replacement of the first part and a second security key;
authenticating the second device based on whether the second security key is identical to the first security key and updating a resource of the first part based on the part replacement result; and
transmitting, to the second device, a fourth message notifying that the resource of the first part is updated.

2. The method of claim 1, wherein the at least one resource includes at least one of: information on the replacement condition of the first part, information on replacement history of the first part, or information on a replacement recommendation procedure for the first part.

3. The method of claim 1, wherein whether or not the replacement condition is satisfied is determined based on information on the replacement condition in the at least one resource or information on a status of the first part which is received from the second device.

4. The method of claim 1, wherein the first device is an infrastructure node-common service entity (IN-CSE), the second device comprises a second application entity (AE), and the third device comprises a first AE.

5. The method of claim 1, wherein the at least one resource comprises a device resource for a device and part resources for each of the plurality of parts.

6. The method of claim 5, wherein the part resources for each of the plurality of parts includes a first attribute indicating a number of past replacements of a part, a second attribute indicating a maximum possible number of replacements of the part, a third attribute indicating a time when the part was replaced, a fourth attribute indicating the replacement condition for the part, or a fifth attribute indicating a target to which satisfaction of the replacement condition is to be notified, and wherein updating the resource of the first part based on the part replacement result comprises updating the first attribute related to the first part and the third attribute related to the first part.

7. A method performed by a second device in a machine-to-machine (M2M) system, the method comprising:

receiving, from a first device managing information on parts in the second device, a second message for recommending replacement of a first part among parts;

in response to the receiving of the second message, outputting an alarm notifying occurrence of a recommendation concerning the first part;

transmitting, to the first device, a third message indicating replacement of the first part;

receiving, from the first device, an acknowledgement message including a first security key; and transmitting, to the first device, a part replacement result including information on replacement of the first part and the received first security key; and receiving, from the first device, a fourth message notifying that a resource of the first part is updated, wherein the first device receives a first message requesting registration of at least one resource related to the second device from a third device, and wherein the first message includes information on replacement conditions for one or more parts of the second device.

8. The method of claim 7, further comprising:

transmitting a message for notifying completion of the replacement of the first part, to the first device, if the replacement of the first part is completed.

9. The method of claim 8, wherein the message for notifying the completion of the replacement is transmitted in response to a user's input.

10. A first device in a machine-to-machine (M2M) system, the first device comprising:

a transceiver; and a processor coupled with the transceiver, wherein the processor is configured to:

receive, from a third device, a first message, which requests registration of at least one resource related to a second device including a plurality of parts, generate and register, by the first device, at least one resource comprising information on the plurality of parts, and transmit, to the second device, a second message for recommending replacement of a first part of the plurality of parts if a replacement condition for the first part is satisfied, receive, from the second device, a third message indicating replacement of the first part;

transmit, to the second device, an acknowledgement message including a first security key;

receive, from the second device, a part replacement result including information on replacement of the first part and a second security key;

authenticate the second device based on whether the second security key is identical to the first security key and update a resource of the first part based on the part replacement result; and transmit, to the second device, a fourth message notifying that the resource of the first part is updated, wherein the first message includes information on replacement conditions for one or more parts of the second device.

11. The first device of claim 10, wherein the at least one resource includes at least one of: information on the replacement condition of the first part, information on replacement history of the first part, or information on a replacement recommendation procedure for the first part.

12. The first device of claim 10, wherein whether or not the replacement condition is satisfied is determined based on information on the replacement condition in the at least one resource or information on a status of the first part which is received from the second device.

13. The first device of claim 10, wherein the first message is received from an application entity (AE) in the second device, or an AE in a third device.

14. The first device of claim 10, wherein the first device is an infrastructure node-common service entity (IN-CSE), the second device comprises a second application entity (AE), and the third device comprises a first AE.

15. The first device of claim 14, wherein the part resources for each of the plurality of parts includes a first attribute indicating a number of past replacements of a part, a second attribute indicating a maximum possible number of replacements of the part, a third attribute indicating a time when the part was replaced, a fourth attribute indicating the replacement condition for the part, or a fifth attribute indicating a target to which satisfaction of the replacement condition is to be notified, and wherein the processor is configured to update the first attribute related to the first part and the third attribute related to the first part based on the part replacement result.

* * * * *